M. JOHNSON.
AUTOMATIC COMPENSATING DEVICE.
APPLICATION FILED SEPT. 25, 1916.
1,228,678.
Patented June 5, 1917.
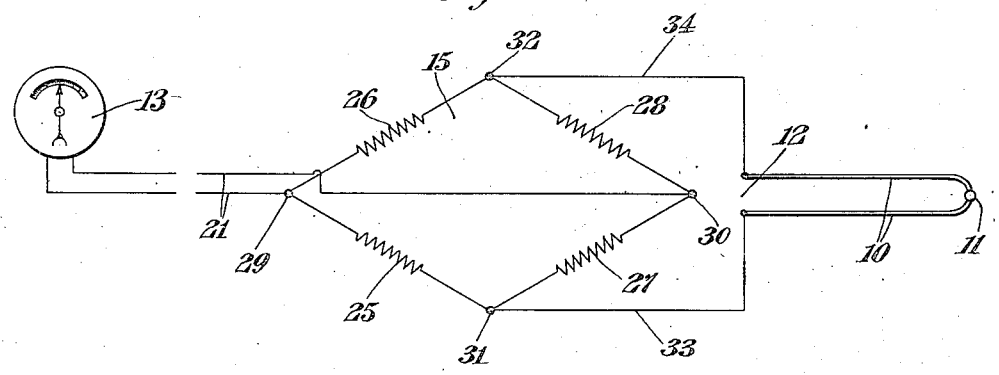
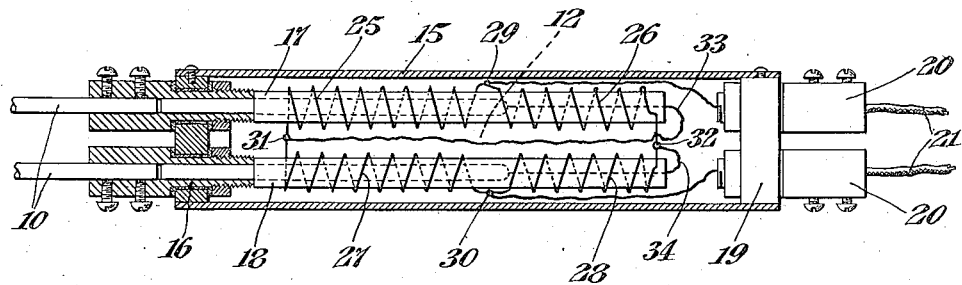
Inventor
Manfred Johnson
By his Attorney

UNITED STATES PATENT OFFICE.

MANFRED JOHNSON, OF NAUGATUCK, CONNECTICUT, ASSIGNOR TO THE BRISTOL COMPANY, OF WATERBURY, CONNECTICUT, A CORPORATION OF CONNECTICUT.

AUTOMATIC COMPENSATING DEVICE.

1,228,678.

Specification of Letters Patent.　Patented June 5, 1917.

Application filed September 25, 1916. Serial No. 121,989.

*To all whom it may concern:*

Be it known that I, MANFRED JOHNSON, a citizen of the United States, and resident of Naugatuck, in the county of New Haven and State of Connecticut, have invented certain new and useful Improvements in Automatic Compensating Devices, of which the following is a specification.

The invention relates to improvements in measuring instruments, more particularly to pyrometers of the thermo-electric type, comprising a thermo-electric couple composed of two dissimilar metals joined at one end to form the hot end of the couple, and of a suitable electrical measuring instrument to which the two free ends, or cold end of the couple, are adapted to be connected. It is well known that variations from a predetermined standard of temperature at the said cold end of the couple cause erroneous indications by the measuring instrument of the temperature to which the hot end of the couple is exposed.

The invention has for its object to provide means in connection with the cold end of said couple to automatically compensate over the working range of the couple for the effects of variations in temperature at said cold end from a predetermined standard temperature, as well as to simultaneously therewith compensate for the effects of temperature changes at the measuring instrument itself. A further object of the invention is to afford a device of this character which shall be substantial, permanent and may, if desired, be attached rigidly to the couple itself. To this end, the invention consists in applying the Wheatstone principle of resistance-grouping to the said cold end; but, contrary to the usual practice, omitting a source of constant potential, heretofore considered necessary in compensating devices of somewhat similar character.

In the accompanying drawings, which illustrate the invention—

Figure 1 is a diagrammatic view of the electrical connections involved; and Fig. 2 is a section through the compensating device as attached to the thermo-electric couple.

Similar characters of reference designate corresponding parts throughout the several views.

Referring to the drawings, 10 designates the thermo-electric couple composed of two dissimilar metals, joined together at one end to form the hot end or junction 11, as is well understood. The free ends of these elements form the cold end or junction 12 of the couple, and may be connected by intermediate conductors, or directly, to the compensating member hereinafter set forth, it being essential only that the said compensating member be located in close proximity to the said cold ends in order that both shall be exposed to substantially the same temperature. 13 designates any suitable electrical instrument for measuring the difference of potential created in exposing the two ends of the thermo-electric couple to different temperatures, all of which is well understood and forms no part of the present invention.

Included between the said instrument and the said cold end of the couple, and in close proximity to the latter, is the temperature compensating device 15 which, as shown in the drawings, may consist of a tubular member provided at one end with a closure 16 through which are inserted the two ends, or continuations thereof, of the thermo-electric couple. Over the said ends are mounted tubes 17 and 18 respectively of suitable insulating material, such as fiber, and the couple ends therein are arranged to extend substantially midway of the member 15. The opposite end of the said tubular member is provided with a closure 19 to which are secured suitable connecting members or binding posts 20 for receiving the conductors 21, whereby the couple may be connected to the measuring instrument 13. About the tube 17 is wound a pair of resistances 25 and 26, and about the tube 18 a pair of resistances 27 and 28, the former being joined together at 29 and the latter at 30, and substantially midway of their respective tubes. The outer end of resistance 25 is cross-connected to the corresponding end of resistance 27; and similarly, the outer end of resistance 26 to the corresponding end of resistance 28, at 31 and 32 respectively. Junction 29 is connected to one of the binding posts 20, and the junction 30 to the other of said binding posts 20, whereby the same may be placed in direct connection with the measuring instrument 13 through the conductors 21. The cold end of the thermo-couple, which is thus located substantially midway of the tube 15, is arranged to be connected to the junctions 31 and 32 by means of a conductor 33 attached to one of the elements, passing out of the tube 17 and through the space between the two said tubes to the junction 31, and a conductor 34, passing through the tube 18 to the junction 32. In this manner, a compact, substantial and well-protected compensating device is rigidly secured to the thermo-couple in proximity to its cold end, and means provided for convenient connection to the measuring instrument. It has been found, furthermore, that the compensator exerts also a substantial compensating effect on the said measuring instrument itself for temperature variations at this point.

The resistances 25, 26, 27 and 28 are so chosen that the proper compensation will be effected, and the oppositely-disposed arms 25 and 28 may be of equal or of unequal resistance as well as the arms 26 and 27. It has been found with a resistance of 20 ohms each for the resistances 26 and 27 and of 52 ohms each for resistances 25 and 28 that the same will give satisfactory results when platinum-rhodium couples are employed; and where couples composed of base metals are employed, resistances 26 and 27 may be reduced to 10 ohms each and afford satisfactory results. It is preferred to select the resistances 25, 26 and 27 of such material, for example manganin, that the same shall all be of substantially zero temperature coefficient, in which case the resistance 28 may be of such material, for example nickel or other suitable metal, that its resistance will vary with change of temperature proportionately to the corresponding change in electro-motive force of the thermo-electric couple whose cold end is exposed to such variation. Or, in certain instances, it might be desirable to have only resistances 26 and 27 of a material having a zero temperature coefficient.

I claim:

1. Automatic temperature compensating device for a thermo-electric pyrometer, including a thermo-electric couple and a measuring instrument connected therewith comprising: a plurality of resistances arranged in the form of a Wheatstone bridge, the cold end of the couple being connected directly across one pair of opposite junctions thereof and in close proximity thereto, and the measuring instrument connected directly across the other pair, whereby variations of temperature at said cold end of the couple will be substantially without effect as to the indications of said measuring instrument.

2. Automatic temperature compensating device for a thermo-electric pyrometer, including a thermo-electric couple and a measuring instrument connected therewith comprising: a plurality of resistances arranged in the form of a Wheatstone bridge, the resistance of the two oppositely-disposed arms thereof being equal, and the cold end of the couple being connected directly across one pair of opposite junctions of said bridge and in close proximity thereto, and the measuring instrument connected directly across the other pair, whereby variations of temperature at said cold end of the couple will be substantially without effect as to the indications of said measuring instrument.

3. Automatic temperature compensating device for a thermo-electric pyrometer, including a thermo-electric couple and a measuring instrument connected therewith comprising: a plurality of resistances arranged in the form of a Wheatstone bridge, the resistance material of three of the arms thereof being of zero temperature coefficient, and the other of a resistance increasing proportionately to the change of E. M. F. of the cold end of the couple, the said cold end being connected directly across one pair of opposite junctions of said bridge and in close proximity thereto, and the measuring instrument connected directly across the other pair, whereby variations of temperature at said cold end of the couple will be substantially without effect as to the indications of said measuring instrument.

4. Automatic temperature compensating device for a thermo-electric pyrometer, including a thermo-electric couple and a measuring instrument connected therewith comprising: a plurality of resistances arranged in the form of a Wheatstone bridge, three of the resistances being of manganin and the fourth of nickel, the cold end of the couple being connected directly across one pair of opposite junctions thereof and in close proximity thereto, and the measuring instrument connected directly across the other pair.

5. Automatic temperature compensating device for a thermo-electric pyrometer, including a thermo-electric couple and a measuring instrument connected therewith comprising: a cylindrical casing, two tubes of insulating material mounted therein and surrounding the cold end of the thermo-couple, resistance wire wound in pairs upon each of said tubes and arranged in the form of a Wheatstone bridge, the cold end of the couple extending midway into the tubes and being connected across one pair of opposite junctions of said bridge, and the measuring instrument connected directly across the other pair.

Signed at Waterbury, in the county of New Haven and State of Connecticut this 22nd day of September, A. D. 1916.

MANFRED JOHNSON.

Witnesses:
Wm. H. Bristol,
Samuel R. Bristol.